United States Patent
Tholen et al.

(10) Patent No.: US 9,447,503 B2
(45) Date of Patent: Sep. 20, 2016

(54) CLOSED PORE CERAMIC COMPOSITE ARTICLE

(75) Inventors: Susan M. Tholen, Kennebunk, ME (US); Christopher W. Strock, Kennebunk, ME (US)

(73) Assignee: United Technologies Corporation, Hartford, CT (US)

(*) Notice: Subject to any disclaimer, the term of this patent is extended or adjusted under 35 U.S.C. 154(b) by 2778 days.

(21) Appl. No.: 11/755,281

(22) Filed: May 30, 2007

(65) Prior Publication Data

US 2009/0130424 A1   May 21, 2009

(51) Int. Cl.
| | |
|---|---|
| *F01D 11/08* | (2006.01) |
| *F01D 11/12* | (2006.01) |
| *C23C 28/04* | (2006.01) |
| *C04B 38/00* | (2006.01) |
| *F01D 25/00* | (2006.01) |
| *C04B 111/00* | (2006.01) |

(52) U.S. Cl.
CPC ............ *C23C 28/04* (2013.01); *C04B 38/0061* (2013.01); *C04B 2111/00525* (2013.01); *C04B 2111/00982* (2013.01); *F01D 11/08* (2013.01); *F01D 11/12* (2013.01); *F01D 25/005* (2013.01); *F05D 2300/6033* (2013.01); *F05D 2300/611* (2013.01); *Y10T 428/24997* (2015.04)

(58) Field of Classification Search
CPC .......... C23C 28/04; Y10T 428/24997; C04B 38/0061; C04B 2111/00525; C04B 2111/00982; F01D 11/08; F01D 11/12; F01D 25/005; F05D 2300/611; F05D 2300/6033

USPC ........... 415/173.4, 173.5, 174.4, 174.5, 200; 416/229 A, 241 R, 241 B; 277/414, 415; 428/632, 633, 469, 472, 314.4; 427/372.2, 376.1, 376.2, 453, 454, 427/419.2

See application file for complete search history.

(56) References Cited

U.S. PATENT DOCUMENTS

| | | | |
|---|---|---|---|
| 4,247,249 A | * | 1/1981 | Siemers ...................... 415/173.4 |
| 4,273,824 A | | 6/1981 | McComas |
| 4,704,332 A | | 11/1987 | Brennan |
| 5,064,727 A | | 11/1991 | Naik |
| 5,780,146 A | * | 7/1998 | Mason et al. .................. 428/328 |
| 6,102,656 A | | 8/2000 | Nissley |
| 6,177,200 B1 | | 1/2001 | Maloney |
| 6,284,323 B1 | | 9/2001 | Maloney |

(Continued)

FOREIGN PATENT DOCUMENTS

| | | | | |
|---|---|---|---|---|
| EP | 1541808 A1 | * | 6/2005 | ............... F01D 5/28 |
| WO | WO 99/48837 | | 9/1999 | |

(Continued)

OTHER PUBLICATIONS

Studart A R et al: "Processing routes to macroporous ceramics: A review", Journal of the American Ceramic Society USA, vol. 89, No. 6, Jun. 1, 2006, pp. 1771-1789, XP002589200.

(Continued)

*Primary Examiner* — Christopher Verdier
(74) *Attorney, Agent, or Firm* — Carlson, Gaskey & Olds, P.C.

(57) ABSTRACT

A composite article includes a substrate and a thermal barrier secured to the substrate. The thermal barrier includes a plurality of closed pores within a ceramic matrix. For example, the closed pores comprise 20 vol % to 80 vol % of the thermal barrier.

17 Claims, 3 Drawing Sheets

(56) References Cited

U.S. PATENT DOCUMENTS

| | | |
|---|---|---|
| 6,428,280 B1 | 8/2002 | Austin |
| 6,443,700 B1 | 9/2002 | Grylls |
| 6,648,596 B1 | 11/2003 | Grylls |
| 6,733,907 B2 * | 5/2004 | Morrison et al. ......... 416/241 B |
| 6,835,465 B2 | 12/2004 | Allen |
| 6,916,529 B2 * | 7/2005 | Pabla et al. ................ 428/314.4 |
| 6,924,040 B2 | 8/2005 | Maloney |
| 2005/0142395 A1 * | 6/2005 | Spitsberg et al. ............. 428/632 |
| 2006/0019087 A1 | 1/2006 | Mazzola et al. |
| 2006/0118984 A1 | 6/2006 | Farber et al. |
| 2006/0280952 A1 * | 12/2006 | Hazel et al. ............... 427/372.2 |
| 2007/0148478 A1 * | 6/2007 | Schmitz et al. .............. 428/469 |

FOREIGN PATENT DOCUMENTS

| | | |
|---|---|---|
| WO | WO 01/73147 A2 | 10/2001 |
| WO | WO 2005/118506 | 12/2005 |

OTHER PUBLICATIONS

Extended Search Report mailed on Aug. 2, 2010 for EP08250952.

* cited by examiner

CLOSED PORE CERAMIC COMPOSITE ARTICLE

This invention was made with government support under Contract No. F33615-03-D-2354 Delivery Order 0009 awarded by the United States Air Force. The government therefore has certain rights in this invention.

BACKGROUND OF THE INVENTION

This invention relates to thermal barriers and, more particularly, to abradable ceramic thermal barrier systems and methods of manufacture.

Components that are exposed to high temperatures, such as gas turbine engine components, typically include a protective coating system having one or more coating layers. For example, turbine blades, turbine vanes, and blade outer air seals typically include the coating system to protect from erosion, oxidation, corrosion or the like and thereby enhance durability or maintain efficient operation of the engine. In particular, conventional outer air seals include an abradable ceramic coating that contacts tips of the turbine blades during engine operation such that the blades abrade the coating upon operation of the engine. The abrasion between the coating and blade tips provides a minimum clearance between these components such that gas flow around the tips of the blades is reduced to thereby maintain engine efficiency.

One drawback of the abradable ceramic coating is its vulnerability to erosion and spalling. For example, spalling may occur as a loss of portions of the coating that detach from the component. Loss of the coating increases clearance between the outer air seal and the blade tips and is detrimental to the turbine engine efficiency. One cause of spalling is the elevated temperature within the turbine section, which causes sintering of the ceramic coating. The sintering causes the coating to shrink, which produces stresses between the coating and the component. If the stresses are great enough, the coating may delaminate and detach from the component.

Accordingly, there is a need for a thermal barrier system having enhanced thermal resistance to resist sintering and shrinkage during engine operation and a method for manufacturing the thermal barrier system. This invention addresses those needs while avoiding the shortcomings and drawbacks of the prior art.

SUMMARY OF THE INVENTION

An example composite article includes a substrate and a thermal barrier secured to the substrate. The thermal barrier includes a plurality of closed pores within a ceramic matrix. For example, the closed pores comprise 20 vol % to 80 vol % of the thermal barrier.

An example method of manufacturing the thermal barrier includes forming the plurality of closed pores within the ceramic matrix. For example, the closed pores are formed using a pore-forming agent that is later removed or reduced in size to form the closed pores.

In one example, the composite article is a turbine blade outer air seal for use in a gas turbine engine. For example, the substrate comprises a body and the thermal barrier is secured to the body for providing thermal resistance to a hot gas flow.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
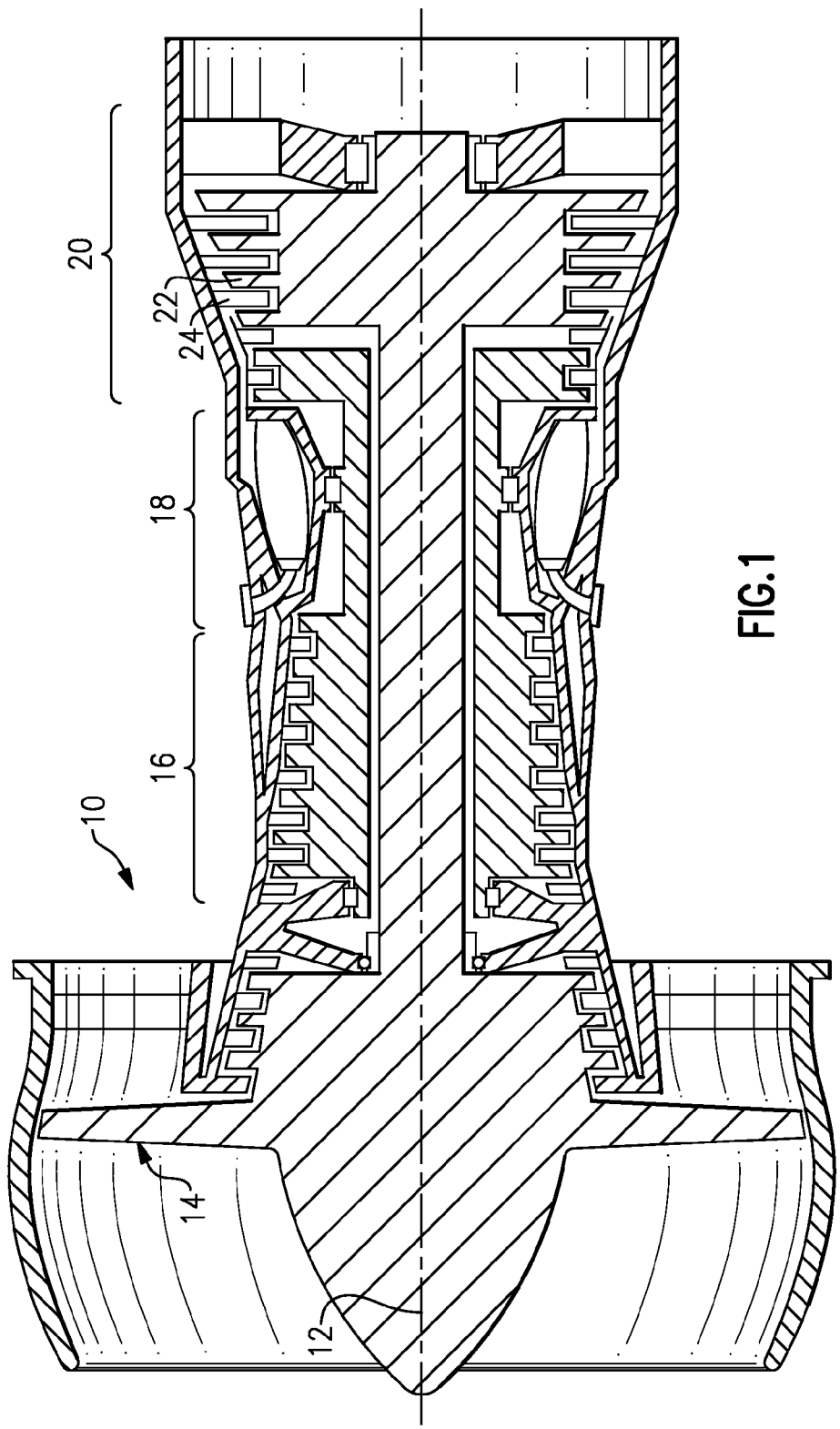
FIG. 1 illustrates an example gas turbine engine.

FIG. 1 illustrates selected portions of an example gas turbine engine 10, such as a gas turbine engine 10 used for propulsion. In this example, the gas turbine engine 10 is circumferentially disposed about an engine centerline 12. The engine 10 includes a fan 14, a compressor section 16, a combustion section 18 and a turbine section 20 that includes turbine blades 22 and turbine vanes 24. As is known, air compressed in the compressor section 16 is mixed with fuel and burned in the combustion section 18 to produce hot gases that are expanded in the turbine section 20. FIG. 1 is a somewhat schematic presentation for illustrative purposes only and is not a limitation on the disclosed examples. Additionally, there are various types of gas turbine engines, many of which could benefit from the examples disclosed herein, which are not limited to the design shown.

Figure 2:
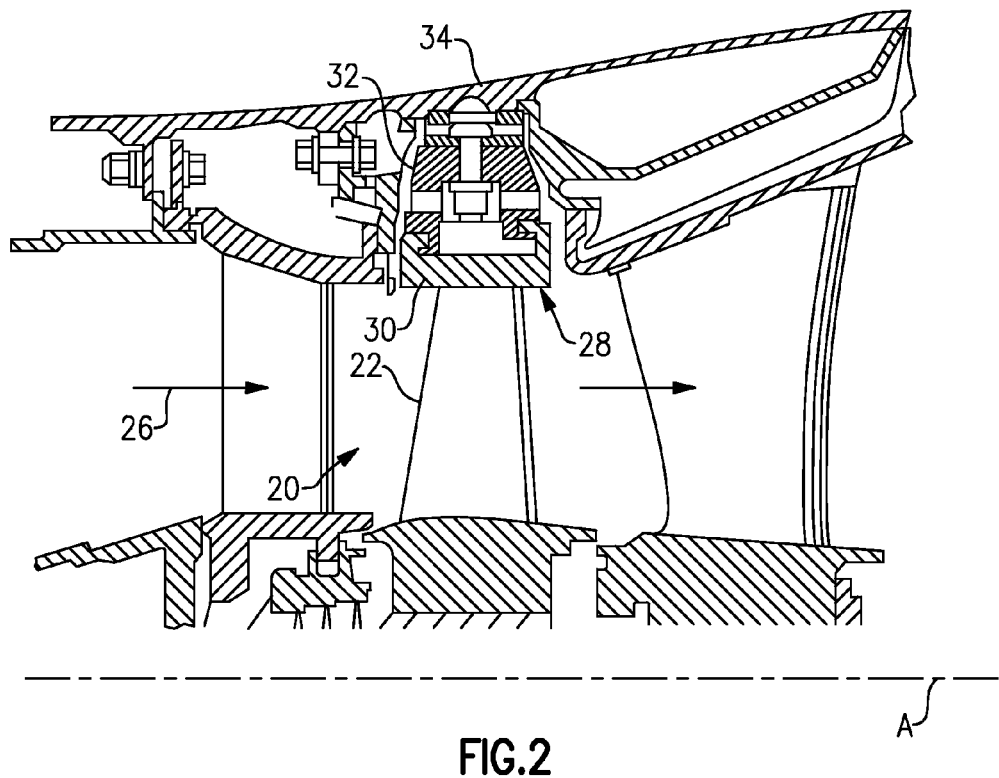
FIG. 2 illustrates a turbine section of the gas turbine engine.

FIG. 2 illustrates selected portions of the turbine section 20. The turbine blade 22 receives a hot gas flow 26 from the combustion section 18 (FIG. 1). The turbine section 20 includes a blade outer air seal system 28 having a seal member 30 that functions as an outer wall for the hot gas flow 26 through the turbine section 20. The seal member 30 is secured to a support 32, which is in turn secured to a case 34 that generally surrounds the turbine section 20. For example, a plurality of the seal members 30 are located circumferentially about the turbine section 20.

Figure 3:
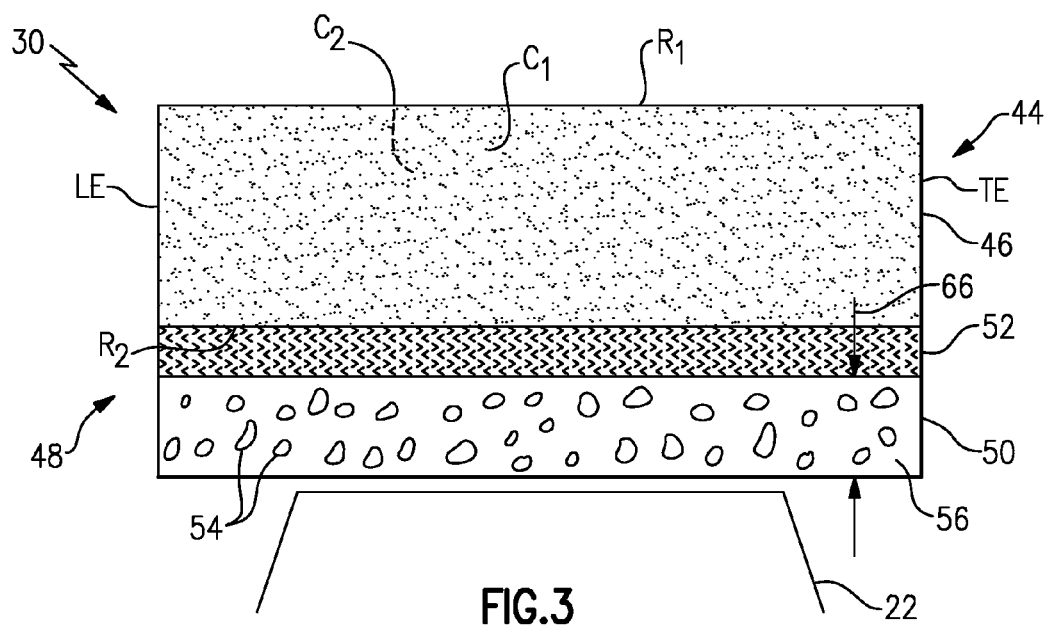
FIG. 3 illustrates a portion of a seal member within the turbine section.

FIG. 3 illustrates an example portion 44 of the seal member 30. In this example, the seal member 30 includes a substrate (i.e. body) 46 having a thermal barrier system 48 disposed thereon. The substrate 46 extends between circumferential side $C_1$ and $C_2$, a leading edge (LE) and a trailing edge (TE), and a radially inner side $R_1$ and a radially outer side $R_2$. The thermal barrier system 48 includes an abradable ceramic member 50 and, optionally, a bond coat 52 between the ceramic member 50 and the substrate 46. The ceramic member 50 includes a thickness 66 along a direction generally perpendicular to the surface of the substrate 46. For example, the thickness 66 is between about 20 mils (0.051 cm) and 150 mils (0.381 cm). In a further example, the thickness 66 is between about 20 mils and 50 mils (0.127 cm). Although a particular thermal barrier system 48 is disclosed, it is to be understood that the disclosed examples are not limited to the illustrated configuration and may include additional layers. Furthermore, although the seal member 30 is shown, it is to be understood that the disclosed examples may also be applied to other types of engine components such as the turbine blades 22 or turbine vanes 24, or to non-engine components.

In this disclosed example, the ceramic member 50 includes closed pores 54 that are encased within a ceramic matrix 56. That is, the closed pores 54 are not fluidly interconnected with each other or with the surrounding environment of the ceramic member 50.

The ceramic member 50 provides several benefits. For example, the presence of the closed pores 54 enhances the thermal resistance of the ceramic member 50 for withstanding sintering and shrinking due to elevated temperatures within the turbine section 20. That is, the void volume enclosed within the closed pores 54 functions as insulation to resist heat transfer through the ceramic member 50 to thereby maintain the ceramic member 50 below its sintering temperature. Additionally, the presence of the closed pores 54 within the ceramic matrix 56 reduces a sintering rate of the ceramic matrix 56. That is, the closed pores 54 have a larger average radius of curvature, larger average pore size, and an increased volume to internal surface area ratio of the ceramic member 50, which in turn reduces the sintering rate of the ceramic matrix 56. This is because the methods of manufacture of a closed pore structure create a fully or nearly fully densified matrix. Thus, if the temperature in the turbine section 20 does exceed the sintering temperature, the closed pores 54 reduce the rate at which the ceramic member 50 sinters.

The closed pore structure of the ceramic member 50 also provides the benefit of maintaining and enhancing efficiency of the turbine engine 10. For example, hot gas flow through the turbine section 20 generally flows around the tips of the turbine blades 22. The closed pore structure prevents at least a portion of the hot gas flow from flowing through the ceramic matrix 56 around the blade tips, as might occur with an open pore structure. Moreover, the closed pore structure prevents debris from infiltrating into the ceramic member 50, which might otherwise melt and react with the ceramic matrix 56, bond coat 52, or substrate 46 to form contaminant phases that detriment the mechanical integrity of the outer air seal 30.

The ceramic member 50 comprises a selected type of ceramic material and includes a selected volume of the closed pores 54. For example, the ceramic matrix 56 includes at least one of yttria stabilized zirconia, zirconia, hafnia, gadolinia, molybdenum disulphide, alumina, or mullite. In a further example, the hafnia, zirconia, or gadolinia of the disclosed examples is selected from a composition disclosed in U.S. Pat. No. 6,284,323 or U.S. Pat. No. 6,924,040. Given this description, one of ordinary skill in the art will recognize other types of ceramic materials to meet their particular needs.

The ceramic member 50 may be manufactured with a selected volume of the closed pores 54 to achieve a desired level of thermal resistance. For example, the volume of the closed pores 54 is between about 20 vol % and 80 vol % of the ceramic member 50. In a further example, the volume of the closed pores 54 is between about 33 vol % and 66 vol %. In a further example, the volume of the closed pores 54 is about 66 vol %. As can be appreciated, a relatively larger volume of the closed pores 54 may be used to achieve a greater insulating effect and a corresponding greater abradability and reduced elastic modulus.

Figure 4:
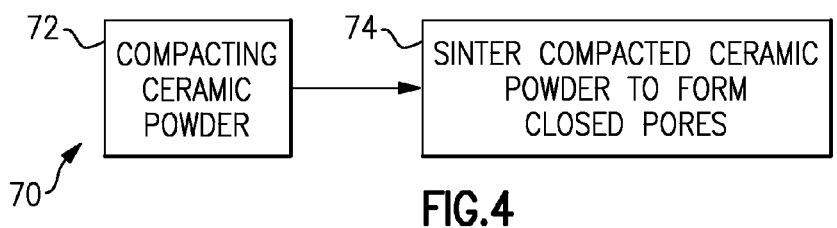
FIG. 4 illustrates an example method of forming a ceramic member having closed pores.

The ceramic member 50 may be manufactured in any of a variety of different methods, including as a coating on the substrate 46 or bond layer 52 or as a separate piece that is then later attached to the substrate 46 or bond coat 52. FIG. 4 illustrates one example method 70 for forming the ceramic member 50. In this example, a ceramic powder comprising one or more of the ceramic materials described above is compacted under pressure at step 72. Typically, ceramic processing that utilizes a powder compaction technique compacts the powder to near 100% theoretical density. However, at step 72, the ceramic powder is compacted to 40% to 60% theoretical density to later form the closed pores 54. In a further example, the ceramic powder is compacted to 50% theoretical density. By compacting to the disclosed levels of theoretical density, intra-particle pores are formed between the ceramic powder particles that will later result in formation of the closed pores 54 upon sintering densification of the ceramic powder. The term "theoretical density" as used in this description refers to the fully dense material, and may be found in common reference materials or determined through known calculations.

Optionally, various binders and lubricants may be intermixed with the ceramic powder particles before step 72. Typically, minimal amounts of binders and lubricants are used because of hindrance to compaction. However, since partial compaction is desired at step 72, relatively larger amounts of the binders and lubricants may be used to achieve a desired level of compacted theoretical density.

After compacting at step 72, the compacted ceramic powder is sintered at steps 74 to form the ceramic member 50. For example, the sintering includes heating the compacted ceramic powder particles at a predetermined sintering temperature to cause diffusion of the ceramic powder particles. The partial diffusing of the ceramic powder particles does not completely fill the intra-particle pores that resulted from partial compacting at step 72, leaving the closed pores 54 after the sintering step 74. In one example, compacting the ceramic powder particles at step 72 between the 40% and the 60% theoretical density results in closed pores 54 that comprise 30 vol % of the ceramic member 50. In a second example, the ceramic composition and sintering temperature may result in partial melting of the ceramic material and the formation of a liquid phase that facilitates densification.

Additionally, the compacted ceramic powder particles are less than 100% sintered. For example, sintering times and sintering temperatures may be determined experimentally, such that a selected sintering temperature and sintering time results in less than 100% sintering of the ceramic powder particles. Sintering the ceramic powder particles less than 100% provides the benefit of preventing the ceramic powder particles from diffusing into the intra-particle pores thereby providing a greater volume of the final formed closed pores 54.

In another example, the compacted ceramic powder particles are sintered to form a fully sintered ceramic matrix 56 (i.e., the ceramic matrix 56 is at or near 100% theoretical density, not counting the volume of the closed pores 54). For example, this may be achieved by sintering sub-micron ceramic particles for a relatively long time at a relatively high temperature until the ceramic crystals become equiaxed and the driving force for sintering is diminished to the point where sintering shrinkage slows to a negligible rate. Alternately, a bimodal pore size distribution of the intra-particle pores may be created in the compacted ceramic powder particles by using a fraction of hollow spheres, fugitive particles, agglomerated sub-micron or nano-particles, etc. The smaller ones of the intra-particle pores would then sinter at a much higher rate, to provide the ceramic matrix 56 having a higher density than the apparent density of the entire ceramic member 50. The ceramic matrix 56 may then be characterized by its own apparent density, pore size and sintering rate, while the ceramic member 50 as a whole may be characterized by its own apparent density, pore size and sintering rate.

Figure 5:
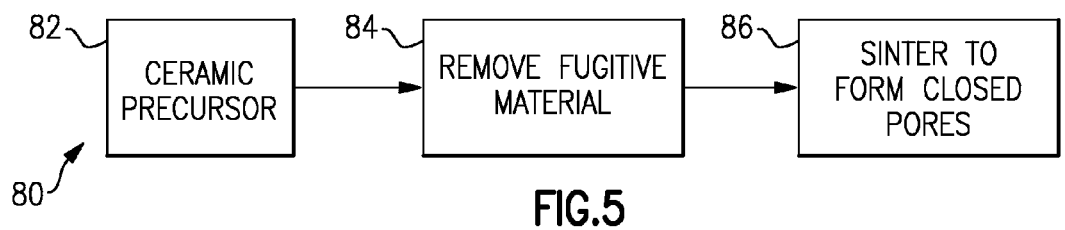
FIG. 5 illustrates another example method of forming a ceramic member having closed pores.

FIG. 5 illustrates another example method 80 for forming the closed pores 54. In this example, a ceramic precursor is formed into a desired shape at step 2. For example, the ceramic precursor is a slurry having ceramic powder particles and a pore-forming agent, such as a fugitive material. The fugitive material is a material that can later be removed, such as by heating at a predetermined temperature to liquefy or vaporize the fugitive material. For example, the fugitive material may include an organic material, such as corn starch or wax. In another example, the fugitive material includes a polymer, such as polyester or polymethylmethacrylate, or graphite. Given this description, one of ordinary skill in the art will recognize other types of polymers and solids that may be used as a fugitive material.

In another example, the slurry of the above example includes ceramic precursor such as a preceramic polymer, salt or other compound that when heated undergoes a change to form the ceramic matrix 56. These types of ceramic precursors may be used as a binder in the above example slurry, or may be used alone. In some examples, these types of ceramic precursors have a volumetric shrinkage and outgas during thermal treatment, which may be advantageous for controlling the structure of the closed pores 54.

At step 84, the fugitive material is removed from the ceramic powder particles. The solvent may first be removed by evaporation over a period of time, by heating the slurry at a predetermined temperature, or in combination with removal of the fugitive material. The fugitive material is removed by heating at predetermined temperature to liquefy or vaporize the fugitive material. For example, the graphite may be oxidized in air to form gaseous carbon dioxide product.

The removal of the fugitive material leaves intra-particle pores between the ceramic powder particles. At step 86, the ceramic powder particles are sintered at a predetermined sintering temperature to at least partially densify the ceramic powder particles. As described above, diffusion of the ceramic powder particles does not completely densify the intra-particle pores. Thus, the ceramic powder particles densify around the pores to form the closed pores 54.

Figure 6:
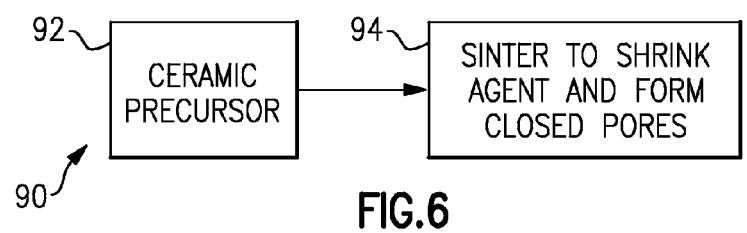
FIG. 6 illustrates another example method of forming a ceramic member having closed pores.

FIG. 6 illustrates another example method 90 for forming the closed pores 54. In this example, similar to the example shown in FIG. 5, a ceramic precursor is used to form the ceramic member 50. The ceramic precursor may include a slurry having ceramic powder particles and a pore-forming agent suspended in a solvent. The slurry may be formed into a desired shape, such as by tape casting.

The pore-forming agent includes a sintering material that reduces in size (i.e., shrinks) upon sintering to leave a pore volume within the surrounding ceramic powder particles or densified ceramic matrix 56. For example, the sintering material comprises agglomerates of nano-sized ceramic particles that shrink upon being heated to a predetermined sintering temperature.

At step 94, the ceramic precursor and sintering material are heated at a predetermined temperature after removal of the solvent to sinter the sintering material and thereby produce intra-particle pores between the ceramic powder particles. Shrinking of the sintering material may be conducted separately from, or in combination with, sintering of the ceramic powder particles to densify the ceramic matrix 56 around the intra-particle pores to form the closed pores 54.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A composite article comprising:
   a substrate; and
   a thermal barrier secured to the substrate, the thermal barrier comprising a plurality of closed pores within a ceramic matrix, wherein the ceramic matrix comprises at least one of yttria stabilized zirconia and molybdenum disilicide.

2. The composite article as recited in claim 1, wherein the plurality of closed pores are each entirely surrounded by the ceramic matrix.

3. The composite article as recited in claim 1, wherein the plurality of closed pores comprise about 20 vol % to 80 vol % of the thermal barrier.

4. The composite article as recited in claim 3, wherein the plurality of closed pores comprise about 33 vol % to 66 vol % of the thermal barrier.

5. The composite article as recited in claim 3, wherein the plurality of closed pores comprise about 66 vol % of the thermal barrier.

6. The composite article as recited in claim 1, further comprising a bond coat between the substrate and the thermal barrier.

7. The composite article as recited in claim 1, wherein the thermal barrier comprises a thickness of about 20 mils to 150 mils.

8. The composite article as recited in claim 7, wherein the thickness is about 20 mils to 50 mils.

9. The composite article as recited in claim 1, wherein the plurality of closed pores is an inherent porosity in the ceramic matrix material.

10. The composite article as recited in claim 1, wherein each of the plurality of closed pores is bounded by a side wall, and the ceramic matrix material is the side wall.

11. The composite article as recited in claim 1, wherein the ceramic matrix comprises the yttria stabilized zirconia.

12. The composite article as recited in claim 1, wherein the ceramic matrix comprises the molybdenum disilicide.

13. A method of manufacturing a thermal barrier, comprising:
   forming the thermal barrier with a plurality of closed pores within a ceramic matrix, including forming the thermal barrier from a ceramic material having a pore-forming agent including nano-sized ceramic particles and sintering the pore-forming agent to reduce the size of the pore-forming agent and thereby form the closed pores.

14. The method as recited in claim 13, wherein the ceramic matrix comprises at least one of yttria stabilized zirconia and molybdenum disilicide.

15. The method as recited in claim 14, wherein the ceramic matrix comprises the molybdenum disilicide.

16. A turbine blade outer air seal comprising:
   a body extending between two circumferential sides, a leading edge and a trailing edge, and a radially inner side and a radially outer side; and a thermal barrier secured to the body, the thermal barrier comprising a plurality of closed pores within a ceramic matrix, wherein the ceramic matrix comprises at least one of yttria stabilized zirconia and molybdenum disilicide.

17. The turbine blade outer air seal as recited in claim 16, wherein the plurality of closed pores comprise about 33 vol % to 66 vol % of the thermal barrier, and wherein the thermal barrier comprises a thickness between about 20 mils and 50 mils.

* * * * *